Fig. 5
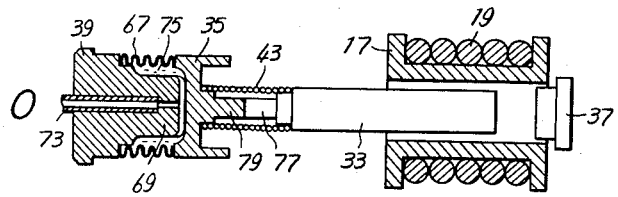
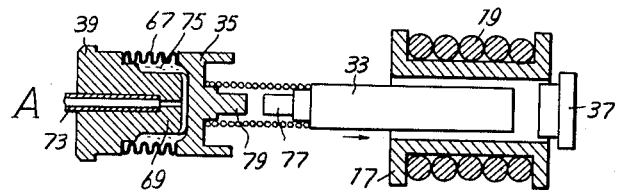
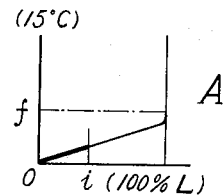
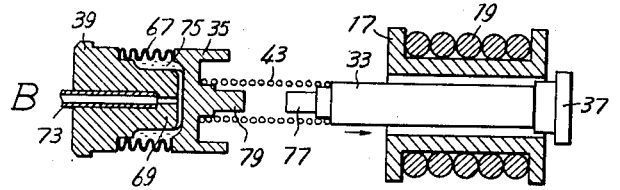
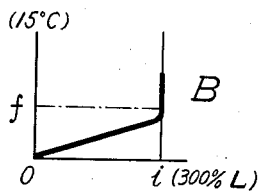
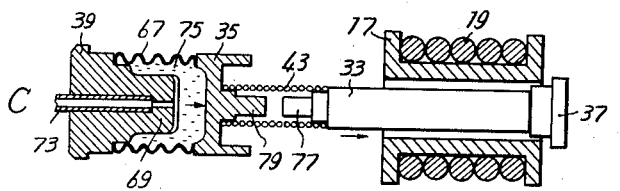
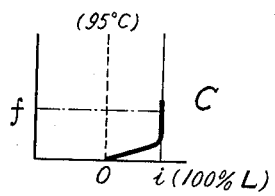
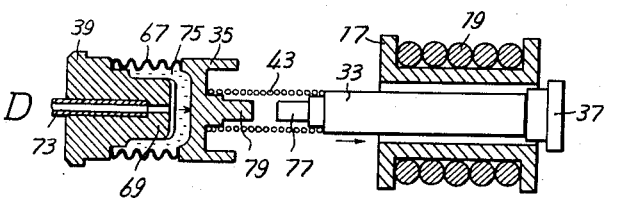
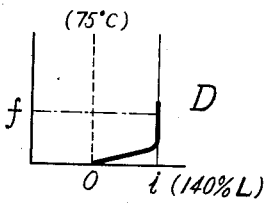
Fig. 6

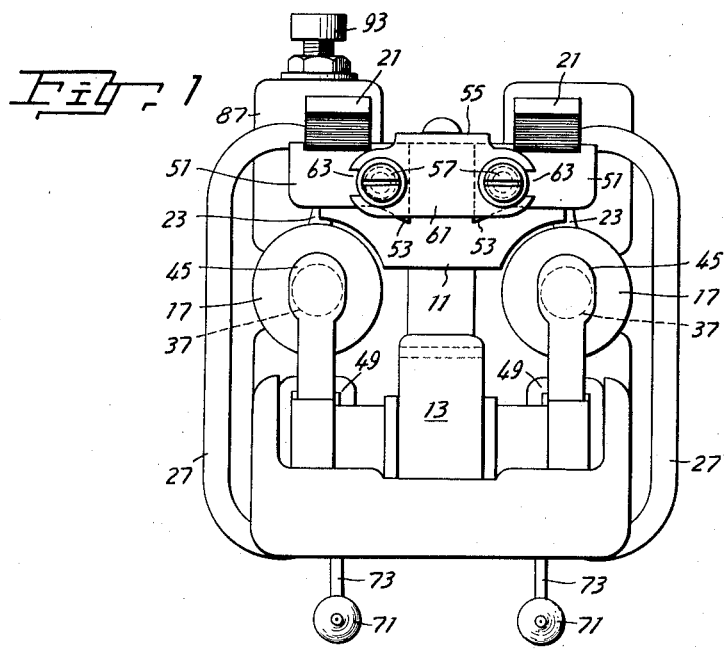
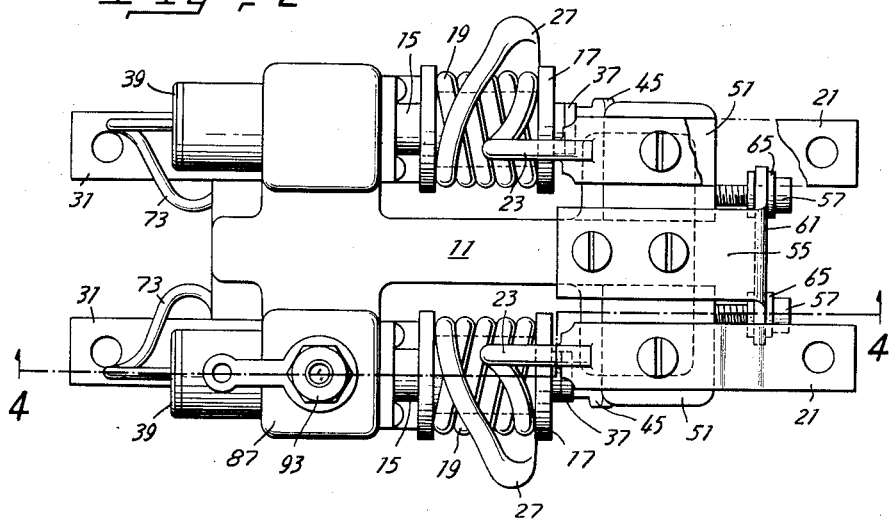

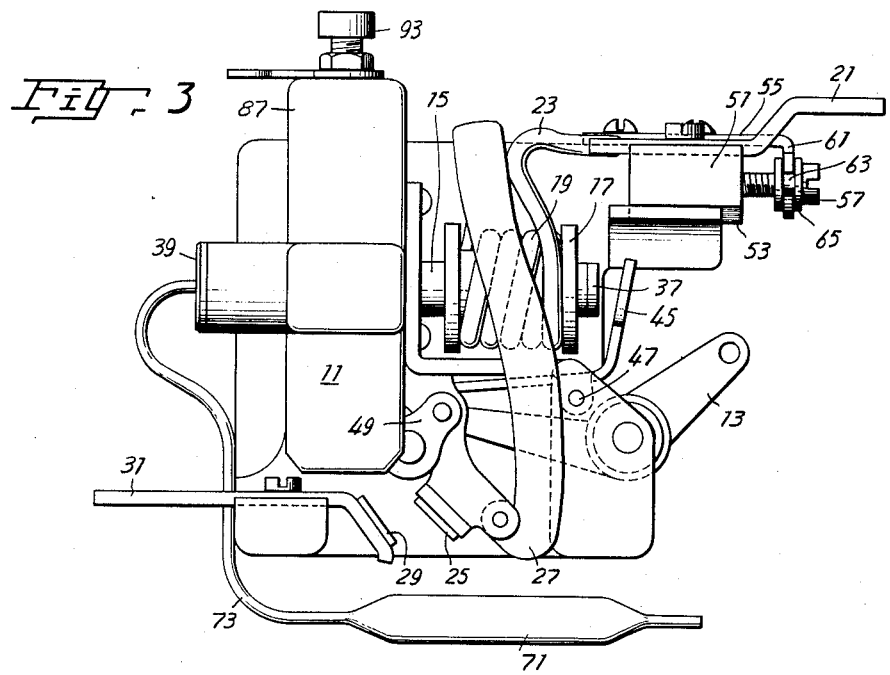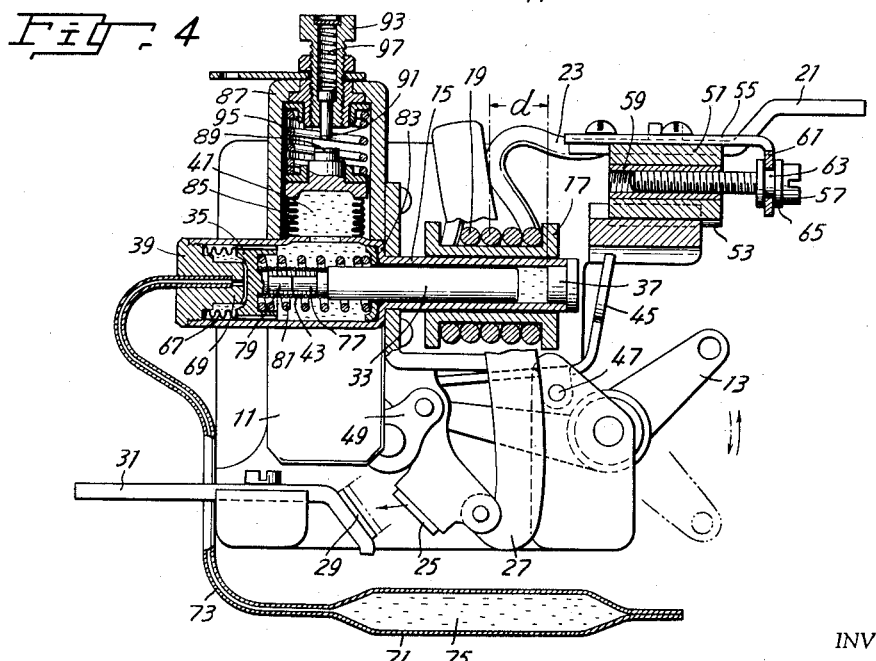

United States Patent Office 2,898,420
Patented Aug. 4, 1959

2,898,420

CIRCUIT BREAKING PROTECTORS

Yoshikazu Kuze, Tokyo, Japan

Application February 12, 1958, Serial No. 714,915

Claims priority, application Japan February 19, 1957

4 Claims. (Cl. 200—87)

This invention relates to improvements in circuit breaking protectors and has for its object the provision of a simple and reliable circuit breaking protector which is to be attached to an electric machinery or appliance, such as a transformer, a motor, etc. and prevents the same from overload.

According to this invention, the circuit breaking protector acts not only at a predetermined value of load current but also at a less value of the current if the machinery or appliance is heated up to a predetermined temperature. It is provided to make possible to select the value of the circuit breaking current at which the circuit breaking protector acts. The value is in inverse proportion to the temperature of the machinery or appliance to be protected. Furthermore, an alarming means is provided which acts at a predetermined temperature of the machinery or appliance to be protected.

By virtue of this circuit breaking protector, an electric machinery or appliance, such as a transformer or a motor, may be prevented easily, reliably and durably from such a trouble as burning.

Briefly stated in accordance with one aspect of this invention, there is provided a circuit breaking protector having an electromagnetic coil which is adapted to be energized by a load current, a movable iron core placed inside said electromagnetic coil and adapted to be attracted by said coil starting from a starting position, an armature adapted to be attracted toward said movable iron core so as to break the circuit of said current when said electromagnetic coil has displaced the movable iron core to a critical position, a thermobulb to be placed within an electric machinery or appliance to be protected and energized by said load current, and a temperature-sensitive member adapted to displace said starting position of said movable iron core in accordance with a change in temperature at said thermobulb by means of communicating a space inside said thermobulb with a space behind said temperature-sensitive member through a capillary tube. These spaces are filled with a liquid and both ends of a close-coiled, weak tension spring are fixed to said movable iron core and said temperature-sensitive member.

The invention will be better understood and other objects and advantages of this invention will become apparent upon perusal of the following description taken in connection with the drawings, and the scope of this invention will be defined in the appended claims.

In the drawings,

Fig. 1 is a front elevation of a circuit breaking protector embodying the principles of this invention.

Fig. 2 is a plan view of the protector shown in Fig. 1.

Fig. 3 is a left side elevation thereof showing the protector not yet energized.

Fig. 4 is a partly vertically sectional view thereof along lines 4—4 of Fig. 2.

Figs. 5 show a part of the protector enlarged, in various positions after the same has been energized.

Figs. 6 are graphs showing action of the protector and relation thereof with temperature, corresponding to Figs. 5.

Referring now to the drawings, a body 11 of an insulating material is provided with a starting lever 13 as shown in Figs. 1, 3 and 4. There are provided two sets of a current-sensitive element and two sets of a temperature-sensitive element centering the lever 13, the right one being symmetrical with the left. Other than the two sets of the two elements, an alarming assembly is provided on the left.

The left set is provided with a non-magnetic cylinder 15 fixed on the body 11. The rear part (left part in Fig. 4) of the cylinder 15 is a big cylinder and the front part is a narrow one. A bobbin 17 is put on the narrow part of the cylinder 15 slidably axially. An electromagnetic coil 19 is provided on the bobbin 17, which is connected with a terminal plate 21 through a rigid lead wire 23 electrically and mechanically and with a movable contact 25 through a flexible lead wire 27 electrically. The movable contact 25 is to be cooperated with a fixed contact 29 which is connected with a terminal plate 31 electrically. When the movable contact 25 is contacting with the fixed contact 29, a load current may flow from the terminal plate 31 to the terminal plate 21 through the fixed contact 29, the movable contact 25, the flexible lead wire 27, electromagnetic coil 19, and the rigid lead wire 23, or vice versa.

A movable iron core 33 is provided inside the cylinder 15 so as to be slidable axially inside the narrow part of the cylinder 15 as if a piston. A temperature-sensitive member 35 is also provided inside the cylinder 15 so as to be slidable axially inside the big part of the cylinder 15. The front end (right end in Fig. 3) of the non-magnetic cylinder 15 is closed by a stationary pole piece 37. The rear end (left end in Fig. 3) of the non-magnetic cylinder 15 is closed by a rear cap 39.

The inside space of the cylinder 15 is filled with a liquid buffer 41, such as silicone oil, which is to be invariable in viscosity when the liquid varies in temperature. The liquid buffer 41 is passable through the clearance between the inside of the cylinder 15 and the movable iron core 33. Both ends of a close-coiled, weak tension spring 43 made of a non-magnetic metal, such as Phosphor bronze, is fixed on the front side of the temperature-sensitive member 35 and on the rear end (left end in Fig. 4) of the movable iron core 33, respectively, so as to pull the movable iron core 33 rearwards and push the same frontwards. An armature 45 is pivoted on a pivot 47 so as to swing thereon. The upper end of the armature 45 is facing against the outer surface of the stationary pole piece 37 and the other end of the armature 45 is connected with the movable contact 25 through a toggle mechanism mechanically, so that, when the upper end of the armature 45 is pulled by the stationary pole piece 37, the movable contact 25 is drawn apart from the fixed contact 29 and the circuit through these contacts is broken ending in to deenergize the electromagnetic coil 19 and the machinery or appliance to be protected.

As already explained hereinbefore, the bobbin 17 may be slid on the narrow part of the non-magnetic cylinder 15 together with the electromagnetic coil 19. The position of the bobbin 17 with respect to the non-magnetic cylinder 15 may be adjusted by virtue of the following construction. An axial groove is formed on the body 11. A terminal supporter 51 made of an insulating material and having such a rib 53 as to match with the axial groove of the body 11 is placed on the body engaging the rib with the groove so as to be slidable axially. The terminal supporter 51 is covered by a covering plate 55 slidably. The covering plate 55 is fixed on the body 11. An adjusting screw 57 is screwed in an internally threaded bush 59 fixedly bedded into the terminal supporter 51. The bended front end 61 of the covering plate 55 is provided with a recess 63. The screw 57 is inserted in the recess 63 between two flanges 65 provided around the neck of the adjusting screw 57. Thus by turning the adjusting screw 57, an assembly comprising the internally threaded bush 59, the terminal supporter 51, the terminal plate 21, the rigid lead wire 23, the electromagnetic coil 19, and the bobbin 17 is displaced axially with respect to the stationary pole piece 37 so as to change a distance $d$ between the axial center of the electromagnetic coil 19 and the stationary pole piece 37.

Inside the big part of the cylinder 15, a bellows 67 is provided between the inside (front side) of the rear cap 39 and the rear side of the temperature-sensitive member 35, so as to keep the inside space of the cylinder 15 liquid-tight from the space behind the temperature-sensitive member 35. Through an inside axial protrusion 69 of the rear cap 39, a fine axial hole is provided. On the front surface of the inside protrusion 69, radial grooves are provided. A thermobulb 71 is provided in order to place within an electric machinery or appliance to be protected from an overload, and has an inside space which is communicated with the inside of the bellows 67 through a capillary tube 73 and the fine hole of the protrusion 69. These spaces are communicated with each other through the radial grooves formed on the front surface of the protrusion 69 even when the temperature-sensitive member 35 is positioned in its rearmost position. These spaces are filled with a liquid 75, such as ethyl alcohol, so as to transfer any change in volume at the thermobulb 71 to the temperature-sensitive member 35 and displace the latter axially. The temperature-sensitive member 35 is connected with the movable iron core 33 by means of the close-coiled, weak tension spring 43 as explained hereinbefore, so that the movable iron core 33 is positioned in accordance with the position of the temperature-sensitive member 35 only when a constant current is flowing through the electromagnetic coil 19. In order to place the closed-coiled, weak tension spring 43 accurately axially and prevent the same from bending into a bow, guide bars 77 and 79 are protruded axially from the rear end of the movable iron core 33 and the front surface of the temperature-sensitive member 35, respectively. Outside the close-coiled, weak tension spring 43, a strong compression spring 81 is inserted between the front surface of the temperature-sensitive member 35 and the shoulder 83 or the connecting flange of the narrow part with the big part of the non-magnetic cylinder 15 so as to push the temperature-sensitive member 35 rearwards with respect to the non-magnetic cylinder 15.

The alarming assembly is provided only on one set, for instance on the left set. Another bellows 85 is provided on the big part of the non-magnetic cylinder 15 and communicated with the inside of the latter so as to be filled with the liquid buffer 41. The bellows 85 is placed inside an upward cylinder 87 and the top of the bellows 85 is secured on the lower side of a travelling contact 89 which is adapted to be slidable in the upward cylinder 87. The top face of the travelling contact 89 is faced against an opposite contact 91 which may be adjusted up and down by means of a cylindrical adjusting screw 93 and a compression spring 97 inserted between the top of the opposite contact 91 and the top of the adjusting screw 93. The travelling contact 89 is adapted to close another circuit with the opposite contact 91 whereby a temperature-rise alarming means, such as a lamp (not shown), is energized independently of the load current so as to indicate a predetermined critical temperature inside the thermobulb 71.

In operation, when no load current is flowing through the electromagnetic coil 19 before a machinery or appliance is connected with the circuit breaking protector or when the machinery or appliance is not yet energized and is kept in the normal temperature, the parts of the protector are kept at rest at the relative position shown in Figs. 3 and 5-O.

When the machinery or appliance has been energized and a current is flowing through the electromagnetic coil 19 correspondingly to a load L which is 100 percent for the machinery or appliance at 15° C., the movable iron core 33 is attracted by the electromagnetic coil 19 so as to displace frontwards (rightwards in Figs. 3 and 5) or approach the stationary pole piece 37 as shown in Fig. 5-A, in proportion to the load current $i$ against the action of the close-coiled, weak tension spring 43, one end of which is fixed on the temperature-sensitive member 35 staying at the position shown in Fig. 5-O. In this case, as far as the front end of the movable iron core 33 does not reach the inside of the stationary pole piece 37, the attraction of the stationary pole piece 37 which acts on the armature 45 is weaker than a predetermined magnetic force $f$ which is strong enough to attract the armature 45, so that the armature 45 is kept at the original position and does not operate the movable contact 25. Thus the circuit of the load current is not broken as shown in Fig. 6-A. In the graphs shown in Figs. 6, abscissae represent currents while ordinates represent magnetic forces. In these cases, it is considered that temperature is also represented by the abscissae.

When the load L increases up to 300 percent even if the thermobulb 71 is kept still at the temperature of 15° C., the front end of the movable iron core 33 reaches the stationary pole piece 37 elongating the close-coiled, weak tension spring 43 as shown in Fig. 5-B so that the attraction of the stationary pole piece 37 increases suddenly which becomes stronger than the predetermined magnetic force $f$ ending in that the armature 45 is attracted by the stationary pole piece 37 and operates the movable contact 25 through the toggle mechanism 49 so as to break the circuit of the load current.

In accordance with this invention, the value of the circuit breaking current is adjusted as follows. When it is required to activate the protector at a weak current, the adjusting screw 57 is turned so as to displace the assembly comprising the terminal plate 21, terminal supporter 51, rigid lead wire 23, electromagnetic coil 19, and the bobbin 17 frontwards (rightwards in Figs. 3 and 5) along the body 11 and the non-magnetic cylinder 15. Thus the axial center of the electromagnetic coil 19 is displaced frontwards and the distance $d$ between the center and the stationary pole piece 37 becomes shorter so as to operate the armature 45 at a weaker value of the circuit breaking current. When it is required to raise the value of the circuit breaking current, the adjusting screw 57 is turned, of course, oppositely so as to extend the distance $d$ between the axial center of the electromagnetic coil 19 and the stationary pole piece 37.

Practically speaking, if the machinery or appliance to be protected is loaded with a slight overload for a rather long period even though not with a considerable overload for a short period, temperature at the machinery or appliance would be raised. In accordance with this invention, the value of the circuit breaking current is reduced in accordance with the temperature rise at the machinery or appliance to be protected from a trouble such as burning. Figs. 5-C and 6-C show the case where the temperature of the machinery or appliance is 95° C., and the value of the load current $i$ corresponds to the 100 percent load L. In this case the movable iron core 33 starts at a point located more frontwards than the axial center of the electro-magnetic coil 19 in accordance with a frontward displacement of the temperature-sensitive member 35 which is brought about by expansion in volume of the liquid 75 contained within the thermobulb 71 placed within the machinery or appliance to be protected.

Figs. 5-D and 6-D show a case where the temperature of the machinery or appliance is 75° C. and the value of the circuit breaking current $i$ corresponds to the 140 percent load L.

As shown in Fig. 4, when the temperature-sensitive member 35 displaces frontwards in accordance with the temperature rise in the machinery or appliance to be protected, the bellows 85 is elongated upwards and the travelling contact 89 is lifted in the upward cylinder 87 through the action of the liquid buffer 41 with which the space defined by the non-magnetic cylinder 15, stationary pole piece 37, temperature-sensitive member 35, bellows 85, bellows 67, rear cap 39, and the travelling contact 89 is filled. Thus when the travelling contact 89 makes another circuit with the opposite contact 91, a temperature-rise alarming means, such as a lamp (not shown), may be energized to indicate the condition in the machinery or appliance. The condition to be indicated by the alarming means may be varied by turning the top of the cylindrical adjusting screw 93. In accordance with the turning of the screw 93, the opposite contact 91 is raised or lowered by a conventional construction. If the opposite contact 91 is pushed upwards by the travelling contact 89 after they have contacted with each other, the opposite contact 91 may be raised against the action of a compression spring 97. Another compression spring 95 is inserted between the top of the upward cylinder 87 and the top of the travelling contact 89 so as to press the latter downwards.

While a particular embodiment of this invention has been illustrated and described, modifications thereof will readily occur to those skilled in the art. It should be understood that the invention is not limited to the particular arrangement disclosed but that the appended claims are intended to cover all modifications which do not depart from the true spirit and scope of the invention.

I claim:

1. A circuit breaking protector comprising an electromagnetic coil which is adapted to be energized by a load current, a non-magnetic cylinder placed inside said electromagnetic coil, said electromagnetic coil being adapted to be slidable axially with respect to said non-magnetic cylinder, an axially movable iron core placed inside said non-magnetic cylinder and adapted to be attracted by said electromagnetic coil starting from a starting position, an armature adapted to be attracted towards said movable iron core so as to break the circuit of said current when said electromagnetic coil has displaced said movable iron core to a critical position, a thermobulb placed within an electric appliance to be protected and energized by said load current, a temperature-sensitive member placed inside said non-magnetic cylinder and adapted to be displaced inside said non-magnetic cylinder displacing said starting position of said movable iron core in accordance with a change in temperature at said thermobulb by means of communicating the inside space thereof with a space behind the temperature-sensitive member through a capillary tube, these spaces being filled with a liquid, and both ends of a close-coiled, a weak tension spring fixed to said movable iron core and said temperature-sensitive member, respectively, and an adjusting assembly for adjusting the position of said electromagnetic coil with respect to said non-magnetic cylinder, comprising a rigid lead wire, a terminal supporter, a stationary covering plate, and an adjusting screw, said screw being adapted to be carried by said stationary covering plate and screwed into and out of said terminal supporter which is fixed with said electromagnetic coil through said rigid lead wire.

2. A circuit breaking protector comprising an electromagnetic coil which is adapted to be energized by a load current, a non-magnetic cylinder placed inside said electromagnetic coil, said electromagnetic coil being adapted to be slidable axially with respect to said non-magnetic cylinder, a stationary pole piece fixed on one end of said non-magnetic cylinder, an axially movable iron core placed inside said non-magnetic cylinder slidably axially and adapted to be attracted by said electromagnetic coil starting from a starting position, an armature adapted to be attracted towards said movable iron core so as to break the circuit of said current when said electromagnetic coil has displaced the movable iron core to a critical position, a thermobulb placed within an electric appliance to be protected and energized by said load current, a temperature-sensitive member placed inside said non-magnetic cylinder and adapted to be displaced inside said non-magnetic cylinder displacing said starting position of said movable iron core in accordance with a change in temperature at said thermobulb by means of communicating the inside space thereof with a space behind the temperature-sensitive member through a capillary tube, these spaces being filled with a liquid, and both ends of a close-coiled, weak tension spring being fixed to said movable iron core and said temperature-sensitive member, respectively, and an alarming assembly comprising an upward cylinder, a travelling contact adapted to slide inside the last-named cylinder, an opposite contact placed adjustably above said traveling contact, and an alarm means, a space defined by said non-magnetic cylinder, said upward cylinder, said temperature-sensitive member, said stationary pole piece, and said traveling contact and including said movable iron core being filled with a liquid buffer so as to transfer a displacement of said temperature-sensitive member to said traveling contact, and said traveling contact being adapted to close another circuit with said opposite contact whereby said alarm means is energized.

3. A circuit breaking protector comprising a body of an insulating material, a starting lever mounted operatively on said body, and a left set and a right set of a protecting assembly, said left set comprising an electromagnetic coil which is adapted to be energized by a load current, the circuit of said load current being closed by contacting a fixed contact with a movable contact which is connected mechanically with said starting lever through a toggle mechanism, a non-magnetic cylinder placed inside said electromagnetic coil, said electromagnetic coil being adapted to be slidable axially with respect to said non-magnetic cylinder, an axially movable iron core placed inside said non-magnetic cylinder and adapted to be attracted by said electromagnetic coil starting from a starting position, a stationary pole piece fixed on one end of said non-magnetic cylinder, an armature adapted to be attracted towards said movable iron core so as to break the circuit of said current when said electromagnetic coil has displaced to a critical position, a thermobulb placed within an electric appliance to be protected and energized by said load current, a temperature-sensitive member placed inside said non-magnetic cylinder and adapted to be displaced inside said non-magnetic cylinder displacing said starting position of said movable iron core in accordance with a change in temperature at said thermobulb by means of communication between the inside space thereof with a space behind the temperature-sensitive member through a capillary tube, these spaces being filled with a liquid, and both ends of a close-coiled, weak tension spring being fixed to said movable iron core and said temperature-sensitive member, respectively, an adjusting assembly for adjusting the position of said electromagnetic coil with respect to said non-magnetic cylinder, comprising a rigid lead wire, a terminal supporter, a stationary covering plate, and an adjusting screw, said screw being adapted to be carried by said stationary covering plate and screwed into and out of said terminal supporter which is fixed with said electromagnetic coil through said rigid lead wire, and an alarm assembly comprising an upward cylinder, a traveling contact adapted to slide inside the last-named cylinder, an opposite contact placed adjustably above said traveling contact, and an alarm means, a space defined by said non-magnetic cylinder, said upward cylinder, said temperature-sensitive member, said stationary pole piece, and said traveling contact and including said movable iron core being filled with a liquid buffer so as to transfer a displacement of said temperature-sensitive member to said traveling contact, and said traveling contact being adapted to close another circuit with said opposite contact whereby said alarm means is energized; and said right set comprising the same components, and being assembled and functioning in the same manner with said left set but said alarm assembly being lacking.

4. A circuit breaking protector comprising an electromagnetic coil energized by a load current, a movable iron core within said electromagnetic coil adapted to be attracted by said coil from a starting position, an armature adapted to be attracted toward said movable iron core so as to break the circuit of said current when said coil has displaced the core to a critical position, a thermobulb within an appliance to be protected and energized by said load current, a temperature-sensitive member adapted to displace the starting position of said core in accordance with a change in temperature in said thermobulb by means of establishing communication between a space in the bulb and a space behind the temperature sensitive member through a capillary tube, the spaces being filled with a liquid, a coiled spring having its ends attached to the movable core and the temperature-sensitive member respectively whereby the circuit is broken at a less predetermined temperature of said current when the appliance is heated to a predetermined temperature, and adjusting means for adjusting the position of said electromagnetic coil with respect to said core.

References Cited in the file of this patent

UNITED STATES PATENTS

| | | |
|---|---|---|
| 1,868,256 | Rippl | July 19, 1932 |
| 2,553,291 | Barr | May 15, 1951 |
| 2,605,327 | Ranson | July 29, 1952 |
| 2,661,451 | Tamm | Dec. 1, 1953 |